United States Patent [19]
Anderson et al.

[11] 3,869,827
[45] Mar. 11, 1975

[54] CONVERTIBLE PORTABLE FOLDING GREENHOUSE

[75] Inventors: John D. Anderson, Holland; Gerald L. Vander Stel, Grand Rapids, both of Mich.

[73] Assignee: Avis Products, Inc., Madison Heights, Mich.

[22] Filed: June 8, 1973

[21] Appl. No.: 368,175

[52] U.S. Cl............................ 47/17, 52/63, 52/204
[51] Int. Cl............................. A01g 9/00, E06b 1/04
[58] Field of Search.............................. 47/17-20; 52/63, 64, 82, 90, 204

[56] References Cited
UNITED STATES PATENTS

| | | | |
|---|---|---|---|
| 2,485,914 | 10/1949 | Owens | 52/63 X |
| 2,639,551 | 5/1953 | McKee | 47/17 |
| 2,982,054 | 5/1961 | Anderson | 52/82 |
| 3,063,195 | 11/1962 | Ravich | 47/17 |
| 3,085,489 | 4/1963 | Ivy | 47/17 X |
| 3,118,186 | 1/1964 | Moss | 52/82 X |
| 3,136,090 | 6/1964 | Carnwath | 47/19 |
| 3,173,436 | 3/1965 | Peters | 52/63 X |
| 3,242,614 | 3/1966 | Thompson | 47/17 |
| 3,333,373 | 8/1967 | Taylor et al. | 52/63 |
| 3,335,535 | 8/1967 | Lane | 52/63 X |
| 3,375,831 | 4/1968 | Serbus | 52/63 X |
| 3,446,272 | 5/1969 | Gaines, Jr. | 47/17 X |
| 3,453,786 | 7/1969 | Rebarchek | 52/63 |
| 3,562,976 | 2/1971 | Wollin et al. | 52/82 X |
| 3,738,956 | 6/1973 | Glatti et al. | 47/19 |
| 3,747,501 | 7/1973 | Honda et al. | 47/17 |

FOREIGN PATENTS OR APPLICATIONS

| | | | |
|---|---|---|---|
| 597,396 | 8/1959 | Italy | 47/19 |
| 1,073,235 | 1/1969 | Germany | 47/17 |

*Primary Examiner*—Edgar S. Burr
*Assistant Examiner*—E. H. Eickholt
*Attorney, Agent, or Firm*—Harness, Dickey & Pierce

[57] ABSTRACT

A series of panels are hingedly interconnected to form an enclosure. One panel is solid, one comprises a door frame and door, and the remaining panels have removable upper and lower sections. A domed roof is supported by radial tubes. The panel sections and roof are fabricated of plastic materials with the proper light transmission and air-impervious characteristics required for the plants. Benches for supporting the plants are secured to the insides of certain panels. The solid panel supports a heater, vent fan and thermostats.

1 Claim, 9 Drawing Figures

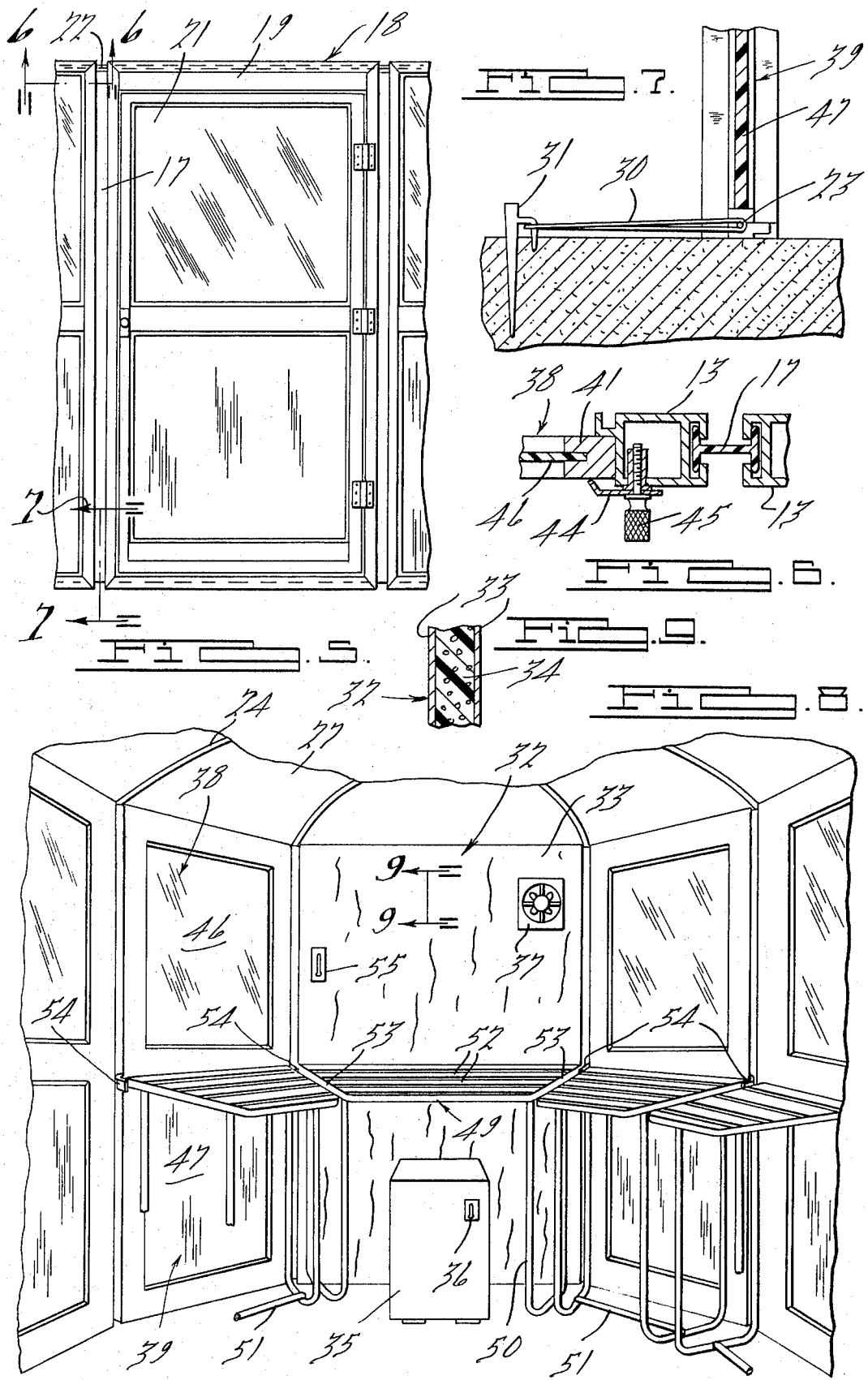

CONVERTIBLE PORTABLE FOLDING GREENHOUSE

BACKGROUND OF THE INVENTION

1. Field of the Invention

The invention relates to greenhouses, that is, enclosures devoted to the protection or cultivation of tender plants. The invention is particularly concerned with greenhouses of a portable and collapsible nature.

2. Description of the Prior Art

Although a cedar and glass collapsible greenhouse is known, this construction takes a long time to assemble and is very expensive as compared with the present invention. A substantial portion of the structure of the present invention is similar to that of U.S. Pat. No. 3,333,373 entitled "Portable Folding Camping Cabin or House." However, the house shown in said patent is incapable of functioning as a greenhouse, nor does it have the other advantages of the present invention set forth below.

BRIEF SUMMARY OF THE INVENTION

It is an object of the present invention to provide a novel and improved portable folding greenhouse which may be assembled quickly and easily, is inexpensive and permits the user to protect and cultivate tender plants in all kinds of weather in his backyard or other easily accessible place.

It is another object to provide an improved greenhouse of this character which may be easily collapsed when not in use and stored in a folded condition so as to occupy a minimum of space.

It is a further object to provide an improved greenhouse of this character which can be converted to different light transmission characteristics so as to adapt its use for the light receiving capability of the plants being grown.

It is also an object to provide an improved greenhouse of this nature which is attractive in appearance and permits the plants to be viewed from the surrounding area.

Briefly, the illustrated embodiment of the invention comprises a plurality of vertically hinged panels forming a circular enclosure and surmounted by radial tubes which support a domed roof. One panel is of solid construction and supports a heater, vent fan and thermostatic controls. Another panel, preferably opposite the solid panel, comprises a door frame and hinged door. Inside the enclosure are a number of benches of sufficient height to support plants being cultivated, the benches being secured to the panels.

The panel sections and roof are fabricated of air-impervious plastic material which will have the desired light transmission characteristics. For example, the top may be fabricated of a woven high density polyolefin and the upper panel sections of transparent flexible vinyl or hard acrylic. The lower panel sections may be of vinyl laminated or opaque fiber glass scrim.

BRIEF DESCRIPTION OF THE DRAWINGS

FIG. 5 is an elevational view of the door panel.

FIG. 6 is a fragmentary bottom plan cross-sectional view taken along the line 6—6 of FIG. 5 and showing the manner in which a panel section is secured.

FIG. 7 is a fragmentary cross-sectional view in elevation taken along the line 7—7 of FIG. 5 and showing the manner in which the lower ends of the panels are secured to the ground.

FIG. 8 is a partial interior view in perspective of the greenhouse showing the solid panel as well as benches for supporting the plants; and FIG. 9 is a detailed cross-sectional view showing a suitable construction of the solid panel, along line 9—9 of FIG. 8.

DESCRIPTION OF THE PREFERRED EMBODIMENT

Figure 1:
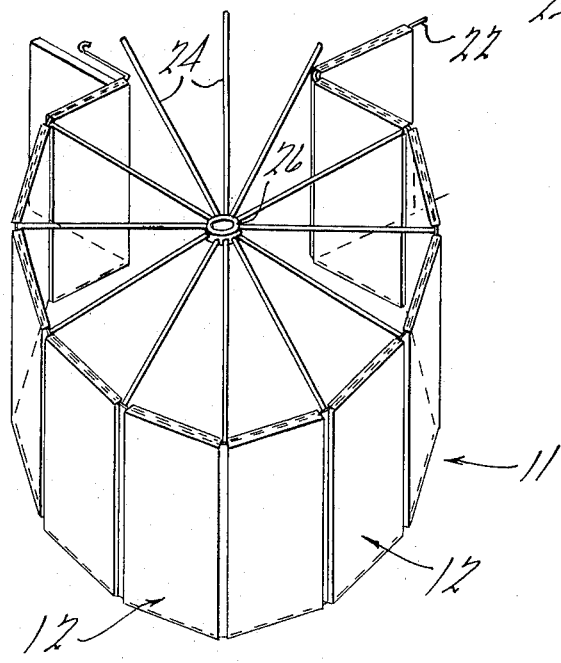
FIG. 1 is a perspective view of the greenhouse with the top and edges, as well as other details, being omitted for clarity, showing the manner in which the panels are unfolded and arranged.
Figure 2:
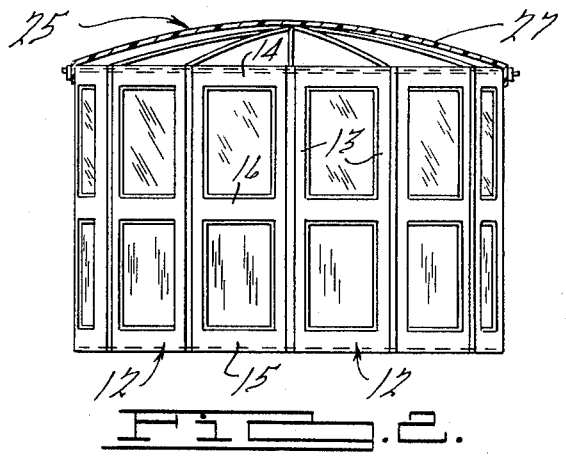
FIG. 2 is a side elevational view of the greenhouse, the roof being sectioned.
Figure 3:
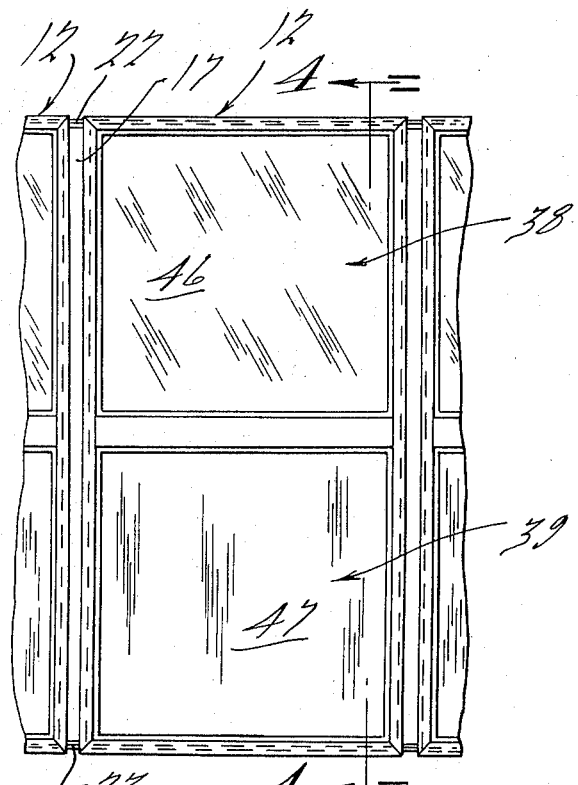
FIG. 3 is a fragmentary elevational view of the greenhouse showing the construction of a single panel.

The greenhouse is generally indicated at 11 in FIG. 1 and comprises a plurality of panels generally indicated at 12 which are hingedly interconnected along their adjacent vertical edges. Each panel 12 may be fabricated of a lightweight material such as an extruded aluminum frame having vertical portions 13, upper and lower horizontal portions 14 and 15 respectively, and a central horizontal portion 16 (FIG. 2). The general construction of each panel 12, as well as several other components of the greenhouse, is similar to corresponding elements in the aforesaid U.S. Pat. No. 3,333,373. Side portions 13 of the panels are interconnected by a plastic hinge 17 with an H-shaped cross section (FIG. 6) so that the panels may be folded flat onto each other into collapsed position, or unfolded to the erected position shown in FIG. 1. One panel generally indicated at 18 in FIG. 5 is a door panel, having a frame 19 within which is hinged a door 21.

Figure 4:
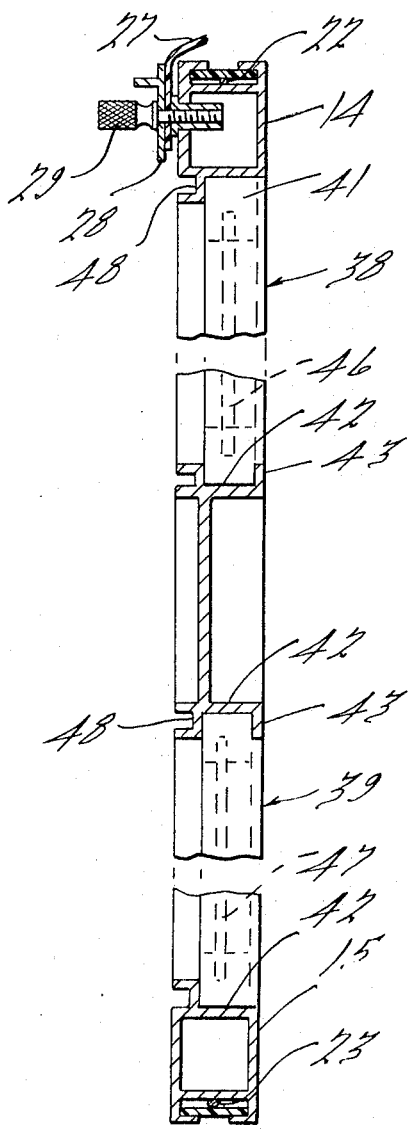
FIG. 4 is an enlarged cross-sectional view in elevation along the line 4—4 of FIG. 3, parts being omitted.

Upper and lower cables 22 and 23 are disposed within the upper and lower portions 14 and 15 respectively of panels 12. These cables serve to unite the panels and support the radial tubes 24 of a roof generally indicated at 25. The tubes extend outwardly from a separable hub 26 and their outer ends engage cables 22 and 23 between panels 12. A domed roof or cover 27 is mounted on tubes 24 and its outer edge is secured in a substantially airtight and weatherproof manner to the outsides of upper portions 14 of panels 12 by elongated members 28 (FIG. 4) which are secured by thumb screws 29.

The material of cover 27 is preferably of a type which is air-impervious but will have proper light transmitting characteristics, when considering the plants which the greenhouse is intended to protect. An example of such material is a woven high density polyolefin.

Lower portions 15 of erected panels 12 are secured to the ground (FIG. 7) by wire loops 30 which extend around the lower cable 23 and are held to the ground by stakes 31.

One of the panels, indicated at 32 in FIG. 8, is a solid panel of any appropriate material. For example, panel 32 may be fabricated of two aluminum sheets 33 with a styrofoam insert 34 therebetween (FIG. 9). This panel, which is hinged to its adjacent panels in the manner aforesaid, has mounted thereto a space heater 35 with a low temperature thermostatic control 36. Also mounted on panel 32 is a vent fan 37. This equipment will be used to automatically control the temperature and air within greenhouse 11. Preferably, panel 32 is opposite door panel 18 so that interference with entrance and egress from the greenhouse will be minimized. Solid panel 32 will be appropriately apertured for heater 35 and vent fan 37.

The other panels 12 each carry upper and lower sections generally indicated at 38 and 39 respectively. Each section comprises a frame 41 which fits within an inwardly facing recess 42, there being two such recesses for each panel 12. Each recess has a lip 42 along one edge (FIG. 4) for retaining the corresponding sections 38 or 39. The section may be secured in position (FIG. 6) by clips 44 and thumb screws 45 screwed into the sides 13 of the panels.

The material which comprises the main portion of each section 38 or 39 is an air-impervious plastic having appropriate light-transmitting characteristics. If plants or flowers are kept in the greenhouse which are capable of receiving intense sunlight, one or both of these inserts 46 and 47 may be of clear flexible vinyl or hard acrylic material. For plants which should be subjected to little or no direct light, lower inserts 47 or both inserts 46 and 47 may be of an opaque fiber glass scrim or similar material. Because of the easy removability and replacement of sections 38 and 39, the greenhouse may be converted without difficulty for use with different types of plants. For situations in which it is desired to have one or both of sections 38 or 39 removed to permit natural ventilation, the panels are provided with channels 48 for receiving the edges of screens (not shown).

A plurality of benches generally indicated at 49 are placed inside greenhouse 11 (FIG. 8) for supporting plants. The height, width and number of these benches may be varied to suit requirements. As illustrated, the benches have legs 50 with lower braces 51, and their tops have slats 52. The sides 53 of the benches are angled so that they may form a continuous surface around the desired portion of the greenhouse. The corners of benches 49 may be secured by clips 54 to vertical portions 13 of panels 12.

The use of greenhouse 11 will be apparent from the foregoing description. In its collapsed condition, the greenhouse will occupy very little space and may be stored in any appropriate place. Benches 49 may also be collapsible by removing legs 50 from the slatted tops 52 and removing braces 51 from between the legs.

When it is desired to set up the greenhouse, panels 12, 18 and 34 will be unfolded and arranged in a circular pattern, the ends of cables 22 and 23 being connected. Tubes 24 will be mounted in place and cover 27 placed thereon, being secured by members 28. Benches 49 will be assembled and placed in position. The benches will be secured to panels 12 by clips 54. The clips will not bear any weight, however. Heater 35 will be installed and the heater as well as fan 37 connected to appropriate sources of power or fuel as the case may be.

Preferably, a high temperature control 55 is mounted on panel 32 and connected to fan 37 so that if the natural heat of the day, and the sunlight entering the greenhouse, raise the temperature inordinately, fan 37 will be activated. Control 36 will respond to lower temperatures to activate heater 35.

We claim:

1. In a portable folding greenhouse, a plurality of rectangular flat panels each having side, upper, lower and horizontal central portions, means hingedly connecting the side portions of adjacent panels together so they may be either folded into a collapsed position or unfolded into an erect circular arrangement, each panel having removable upper and lower sections, with each section having a plastic insert with light transmitting but air-impervious properties, means anchoring the lower edges of said panels to the ground, one of said panels being a door panel, a solid panel opposite said door panel, a heater and vent fan mounted on said solid panel, a low temperature-responsive control for said vent fan, radially arranged tubes removably connected to a central hub and having outer ends engaging a cable which runs through the upper portions of said panels, a cover on said tubes forming a roof, the cover continuously extending outwardly from said hub to said panels and being fabricated between the hub and panels entirely of a plastic material having light transmitting but air-impervious properties, a plurality of adjacent benches within said greenhouse, said benches having legs collapsibly connected to tops and inwardly angled edges so that the benches will interfit with each other, and brackets securing said benches to the side portions of said panels.

* * * * *